United States Patent [19]

Suzuki

[11] Patent Number: 4,858,022
[45] Date of Patent: Aug. 15, 1989

[54] CONTACT-TYPE LINEAR IMAGE SENSOR

[75] Inventor: Kouhei Suzuki, Yokohama, Japan

[73] Assignee: Kabushiki Kaisha Toshiba, Kawasaki, Japan

[21] Appl. No.: 90,093

[22] Filed: Aug. 27, 1987

[30] Foreign Application Priority Data

Sep. 5, 1986 [JP] Japan .................................. 61-209068
Sep. 5, 1986 [JP] Japan .................................. 61-209069

[51] Int. Cl.$^4$ ............................................ H04M 1/024
[52] U.S. Cl. ............................. 358/471; 358/213.15; 358/447; 250/578
[58] Field of Search .............. 358/293, 213.15, 213.14, 358/213.13, 294; 250/578

[56] References Cited

PUBLICATIONS

Yamamoto et al., "A Contact Type Linear Photodiode Array Using Amorphous Thin Film", Japanese Journal of Applied Physics, vol. 17, 1977, pp. 135–140.
IEDM Tech. Dig. 1981, pp. 309–312; "A 2048-Element Contact Type Linear Image Sensor for Facsimile"; K. Komiya et al.; 1981.
Toshiba CCD Image Sensor Data Book '85-7; Toshiba Corp; Jul. 1985.

Primary Examiner—Edward L. Coles, Sr.
Attorney, Agent, or Firm—Oblon, Spivak, McClelland, Maier & Neustadt

[57] ABSTRACT

A contact-type image sensor has amorphous semiconductor photoconductive cells formed on a substrate and divided into cell units each consisting of a number of cells. A drive signal generator is connected to the cells to sequentially select the cell units, thereby sequentially activating the cells of any selected unit. A signal readout circuit is connected to the cell units, for generating a series of pixel signals from pixel currents sequentially supplied from the cells of any selected unit. The signal readout circuit includes a common signal output line connected to the cell units, and a capacitor component connected to this output line, for sequentially accumulating the pixel currents. The capacitor component is not a discrete element, but is equivalent to the sum of the stray capacitance components inherently present in the image sensor, such as parasitic capacitance components and the coupling capacitance between the output line and the ground. An analog switch is connected between the common signal output line and the ground. The analog switch operates in response to a control pulse signal supplied from a switch controller, thereby to reset the common signal output line every time one of the cells of each unit cell is designated after a pixel current is read out from another cell adjacent to this cell. Since the output line is thus reset, and the capacitor component is thereby initialized, the attenuation ratio of each pixel current signal can be reduced.

19 Claims, 5 Drawing Sheets

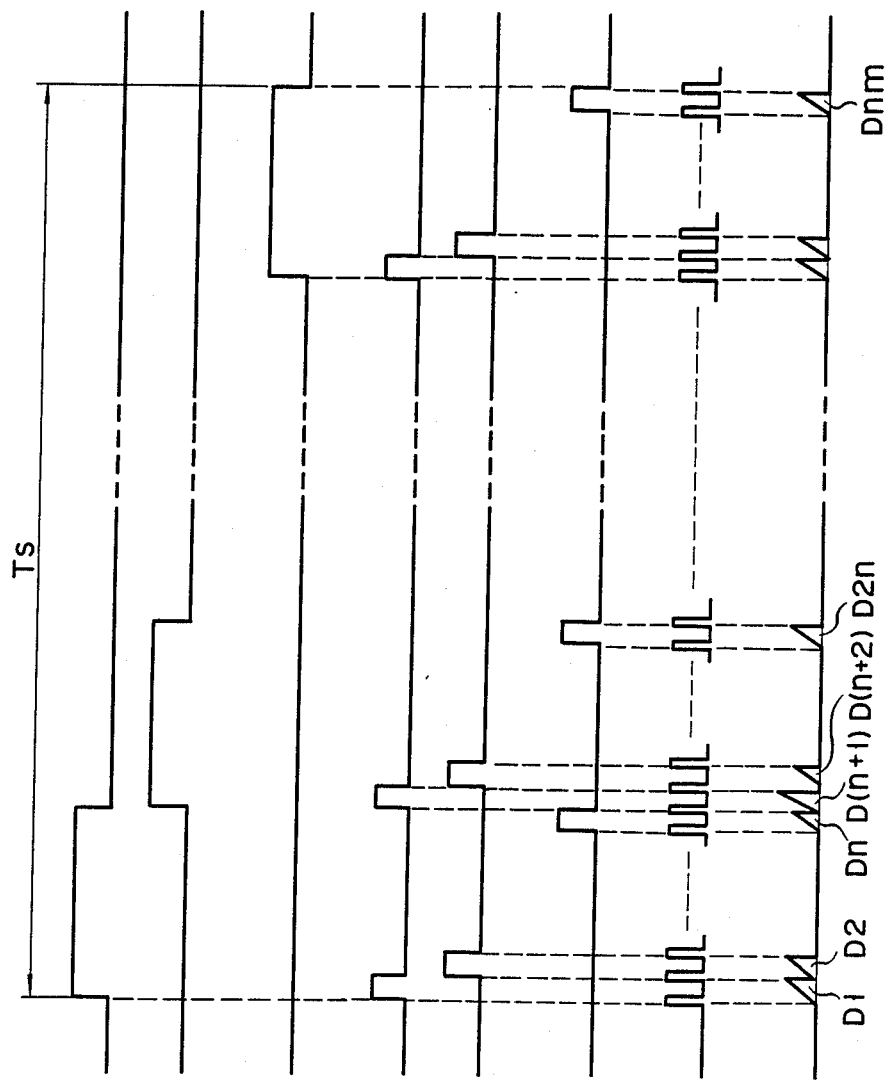

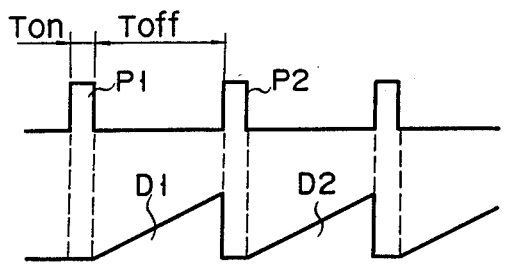
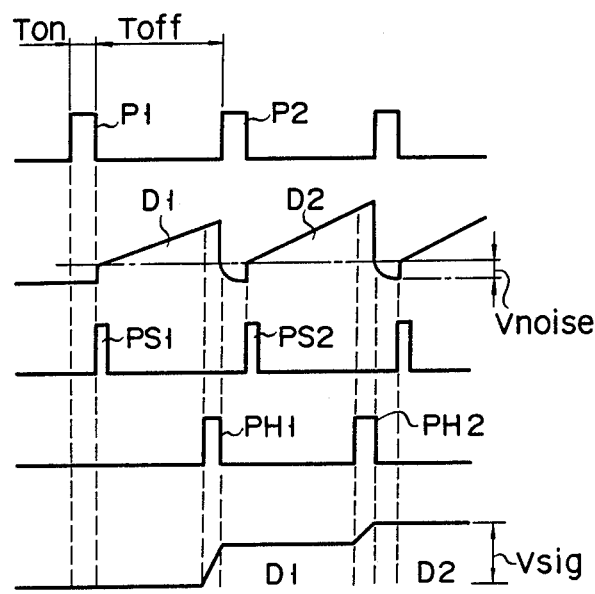

CONTACT-TYPE LINEAR IMAGE SENSOR

BACKGROUND OF THE INVENTION

The present invention relates to a solid-state imaging device and, more particularly, to a contact-type image sensor having a cell array of amorphous semiconductor photoconductive elements which are switch-driven by means of a matrix drive technique.

Amorphous semiconductor image sensors have been used in a wide variety of optical image-reading apparatuses, such as facsimiles, optical character readers (OCR), and copying machines, since their use makes it possible to minituarize these apparatuses. Considerable progress has been made in developing contact-type solid-state linear image sensors which have substantially the same length as the width of a paper document to be read. Such image sensors are advantageous over other imaging devices in that they can eliminate image reduction using a lens system for reducing the image of a document before the document image reaches the image sensors. Hence, they contribute to the miniaturization of optical image-reading apparatuses.

In the contact-type amorphous semiconductor image sensor, a cell array of amorphous semiconductor photoelectric detecting elements is connected to a matrix wiring circuit, and is switch-driven by means of a matrix drive technique. One such contact-type amorphous image sensor is disclosed in U.S. patent application Ser. No. 943,705 (Kouhei SUZUKI et al.), filed Dec. 19, 1986. This image sensor has linearly aligned, photoelectric detecting elements serving as picture elements (pixels). These elements are divided into a predetermined number of cell units connected to an image signal detector and a drive voltage-generating circuit. The image signal detector has a load resistor and an amplifier. The load resistor generates a voltage which changes as the image current signals sequentially supplied to the resistor change. The amplifier amplifies the voltage generated by the resistor, thus providing time-sequential image readout signals.

The contact-type amorphous semiconductor image sensor, which outputs the voltage generated by the load resistor as image signals, does, however have the drawback that it cannot produce time-sequential image signals as quickly as is required. This is inevitable, since the time constant $\tau$ of the image signal detector cannot be sufficiently reduced. The time constant of the image-signal detector is determined by the product of the resistance R of the load resistor and the capacitance of the electrostatic capacitor inevitably present and coupled in parallel to the load resistor. (Capacitance is parastic capacitance, stray capacitance and/or coupling capacitance.) Since the electrostatic capacitance cannot be infinitely reduced, then, in order to reduce time constant $\tau$, it is generally necessary to reduce resistance R of the load resistor. However, if resistance R is decreased, the voltage which can be generated in the load resistor will be reduced. Consequently, the effective component of each image signal output by the image sensor will decrease, thereby reducing the signal-to-noise ratio of the image signal. In the case of an amorphous silicon image sensor, in particular, the voltage which can be generated by the load resistor is significantly lowered. This is because the amorphous silicon forming the photoelectric converting film of this image sensor has a low electroconductivity (a low photosensitivity), though it is superior to that of cadmium sulfide-selenium which forms the photoelectric converting film of a matrix-driven image sensor. Hence, it is an extremely great problem that the signal-to-noise ratio of the image signal decreases when the resistance of the load resistor used in the contact-type amorphous semiconductor image sensor is lowered in order to produce time-sequential image signals at high speed.

SUMMARY OF THE INVENTION

It is therefore an object of the present invention to provide a new and improved contact-type image sensing device which is matrix-driven so as to produce image signals at high speed, thereby maintaining a high signal-to-noise ratio.

In accordance with the above object, the present invention is addressed to a specific image sensor which has a linear array of photoconductive cells, or photoelectric detecting cells, formed on a substrate and made of amorphous semiconductor. These cells are divided into cell units each consisting of a predetermined number of cells. A drive circuit is connected to the photoelectric detecting cells, and generates a drive voltage signal for selecting one of the cell units, thereby to sequentially drive the cells of the selected unit. A signal readout circuit is connected to the cell units, and generates pixel signal voltages corresponding to the pixel signal currents supplied from the cells of each unit. The signal readout circuit includes a signal output line connected to all cell units, and a capacitor component connected to the signal output line for sequentially accumulating the pixel signal currents. This capacitor component is not a discrete capacitor element. Rather, it is an equivalent capacitor defined by the sum of the stray capacitances inherently present in the image sensor (such as parasitic capacitances, a coupling capacitance between the signal output line and the substrate, etc.). The signal readout circuit further includes an analog switch connected to the signal output line, for cyclically resetting the output line each time when one cell of any unit is designated after a pixel current has been read out from another adjacent cell and then accumulated in the capacitor component. Therefore, the signal output line is reset, and the equivalent capacitor is thus initialized, every time a pixel current signal is read out from any cell. Hence, each accumulated pixel current signal can be quickly attenuated, whereby the aforesaid object can be accomplished.

The present invention, and its object and advantages will become more apparent from the following detailed description of the preferred embodiment.

BRIEF DESCRIPTION OF THE DRAWINGS

In the detailed description of the preferred embodiments of the invention, presented below, reference will be made to the accompanying drawings in which:

FIGS. 2A to 2H are diagrams illustrating the waveforms of the electric signals generated in the major components of the image sensor shown in FIG. 1;

FIGS. 3A and 3B are a timing chart showing the control pulse signal supplied to the resetting analog switch provided in the image sensor of FIG. 1, and the image signals read out from the image sensor;

FIGS. 5A to 5E are diagrams illustrating the waveforms of the electric signals generated in the major components of the image sensor shown in FIG. 4.

DETAILED DESCRIPTION OF THE PREFERRED EMBODIMENTS

Figure 1:
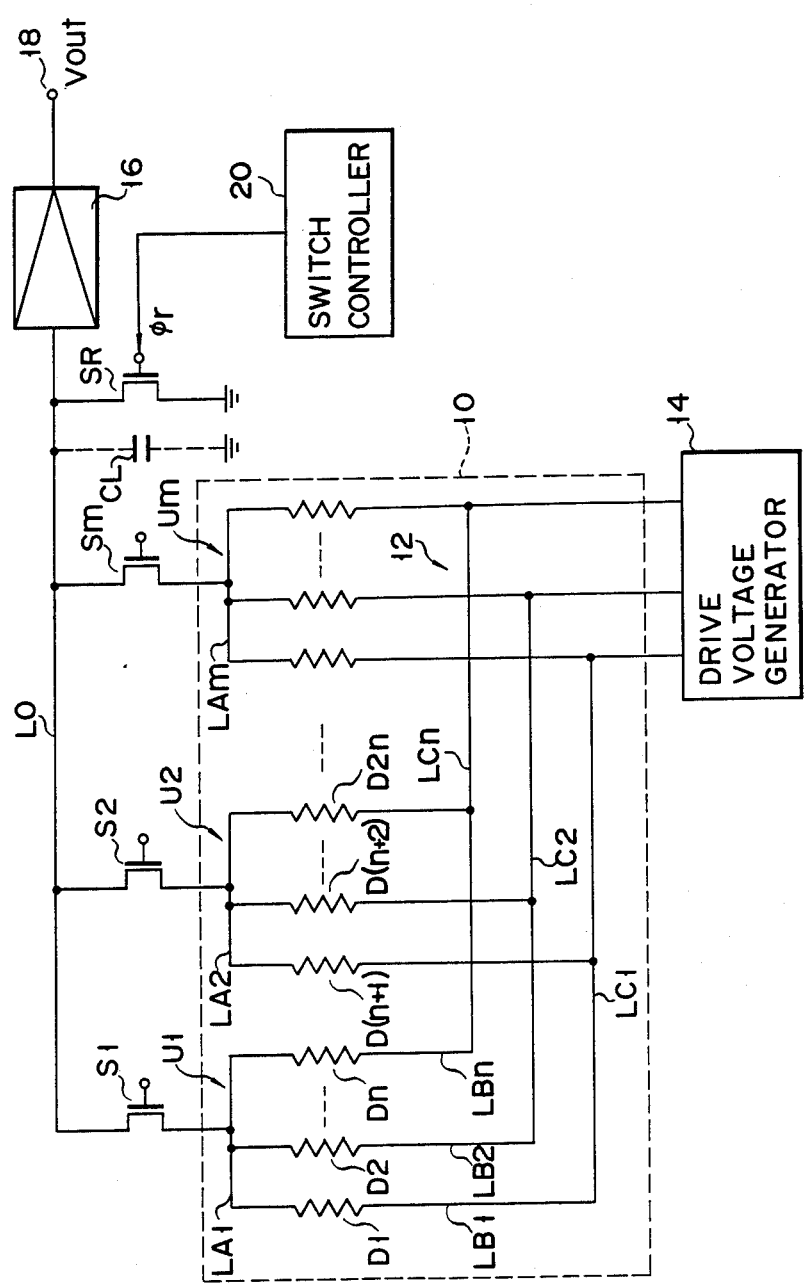
FIG. 1 is a diagram showing the main circuit arrangement of a contact-type, amorphous semiconductor linear image sensor according to a first embodiment of the present invention.

FIG. 1 shows a contact-type, linear image sensor having a pixel array of amorphous semiconductor (silicon) photoelectric detecting elements (also known as "photodetectors" or "photosensors") which are linearly aligned on elongated insulative substrate 10 to function as photoconductive cells (picture elements). In FIG. 1, substrate 10 is shown by a rectangle of broken lines for the sake of illustrative simplification. A well-known stripe-shaped amorphous semiconductor layer (not shown) is formed in a first surface area of substrate 10 and is used as a photoelectric converting layer. The amorphous semiconductor layer can be made of amorphous silicon. A plurality of pairs of elements (not shown) is so formed on the amorphous silicon layer to define photoconductive cells D which are divided into M cell units U1, U2, . . . , Um, each consisting of N cells D1, D2, . . . , Dn. In this embodiment, number M is 54, number N is 32, and hence 1,728 cells in total are used in order to provide an image resolution of 8 pixels/mm for a document of A4-sized paper.

Photoconductive cells D1, D2, . . . , Dn of each cell unit Ui (i=1, 2, . . . , m) are connected, at their first ends, with each other by a common cell electrode wiring line LAi (l=1, 2, . . . , m). Cells D1, D2, . . . , Dn are connected, at their second ends, to individual cell electrode wiring lines LB1, LB2, . . . , LBn, which are provided on an insulative layer (not shown) formed in a second surface area of substrate 10. Lines LB1, LB2, . . . , LBn also serve as column signal lines of a double-layered wiring circuit 12. N parallel signal lines LC1, LC2, . . . , LCn are provided between substrate 10 and the insulative layer These signal lines LC1, LC2, . . . , LCn may function as row lines of wiring circuit 12. Lines LC1, LC2, . . . , LCn are connected with individual cell electrode wiring lines LB1, LB2, . . . , LBn such that each line LCi is connected to the corresponding individual cell electrode wiring lines LB which are belong to cell units U1, U2, . . . , Um, respectively, as shown in FIG. 1.

Lines LC1, LC2, LCn are connected to drive signal generating circuit 14 for generating a drive voltage signal for sequentially driving the cell electrodes of each cell unit Ui. Common wiring line LA are connected to common output line LO by switching transistors S1, S2, ..., Sm, which serve as analog switch elements. These transistors may be metal oxide semiconductor field-effect transistors (MOSFETs). Common output line LO is connected to voltage-amplifying circuit 16 for reading out an image signal from photoconductive cells D. This circuit 16 may be a capacitor-coupling amplifier of the ordinary type. No d.c. amplifiers need to be used to constitute voltage-amplifying circuit 16. Circuit 16 is connected to output terminal 18 of the linear image sensor.

Electrostatic capacitor CL is connected to common output line LO. Equivalently, capacitor CL is connected between the input terminal of voltage-amplifying circuit 16 and the ground potential. Electrostatic capacitor CL is defined by a capacitance component which is the sum of the electrostatic capacitance components within the internal circuit of the image sensor, such as (i) the gate-source, or gate-drain parasitic capacitances of the MOSFETs forming analog switches S1, S2, ..., Sm; (ii) the stray capacitance inherently provided within common output line LO, i.e., the coupling capacitance between line LO and other wiring lines or conductors; and (iii) the input impedance of voltage-amplifying circuit 16. Therefore, any discrete capacitance element need not be provided on common output line LO. This is why the lines connecting capacitor CL to output line LO and the ground are represented by broken lines in FIG. 1. No resistive element functioning as a load resistor is provided on common output line LO.

Switching transistor SR, which serves as a resetting analog switch, is connected to common output line LO, or between the input terminal of voltage-amplifying circuit 16 and the ground potential. Analog switch SR, analog switches S1, S2, ..., Sm, common output line LO, electrostatic capacitor CL, and voltage-amplifying circuit 16 constitute an image signal readout circuit of this image sensing device. Resetting analog switch SR is made of, for example, a MOSFET having a gate electrode which is connected to switch control circuit 20.

Switch controller 20 supplies pulse signal $\phi r$ as a reset control signal to the gate electrode of analog switch SR to render it conductive every time an image current signal is read out from each cell unit Ui. When switch SR is thus made conductive, the potential of common output line LO is made to fall to the ground potential, whereby output line LO is reset. When the next cell unit U(i+1) is selected, analog switch SR is rendered nonconductive under the control of switch controller 20, thus allowing it to transfer the image signal read out from cell unit U(i+1) to voltage-amplifying circuit 16. Analog switch SR operates to effectively prevent the leakage current among the image signals output by the cell units, or the switching noise generated by analog switches S1, S2, ..., Sm or by drive signal generator 14, from being added to the image signal.

The operating mode of the contact-type linear image sensor will now be explained with reference to FIGS. 2A to 2H showing the waveforms of the various signals generated within the image sensor. When the image sensor is used in a facsimile system, it is moved in the lengthwise direction of a document sheet, thus sequentially sensing the line images printed on the document sheet. Analog switches S1, S2, ..., Sm are rendered conductive one after another, each for a predetermined period, during one-line reading period Ts, as can be understood from FIGS. 2A to 2C. One-line reading period Ts is required by photoconductive cells D1, D2, ..., Dn, D(n+1), ..., D2n, ... and Dnm to sense each line image printed on the document sheet.

As is shown in FIGS. 2D to 2F, drive voltage generator 14 sequentially applies drive pulse signals to lines LC of double-layered wiring configuration 12, while analog switches S1, S2, ... Sm are being rendered conductive. More specifically, while analog switch S1, for instance, is being rendered conductive, and the other analog switches S2 to Sm are remaining nonconductive, column lines LB1, LB2, ..., LBn of photoconductive cells D1, D2, ..., Dn of unit U1 are sequentially selected so that cells D1 to Dn are sequentially made active. Hence, while analog switch S1 is remaining conductive, the signal currents generated by photoconductive cells D1 to Dn are sequentially supplied to common output line LO and then accumulated in electrostatic capacitor CL. The current thus accumulated in capacitor CL determines the potential of common output line LO.

While the pixel signals are being read out, switch controller 20 supplies pulse signal or control signal φr to resetting analog switch SR. As is shown in FIG. 2G, control signal φr rises to a high level every time any photoconductive cell of unit U1 is rendered active. Therefore, analog switch SR is rendered conductive whenever another cell adjacent to a certain cell, which is now made inactive, is selected and activated. The potential of common output line LO is thereby reset momentarily to the ground potential. For example, Line LO is reset after the pixel signal current output from cell D1 (i.e., "D1" in FIG. 2H) is accumulated in capacitor CL and before the pixel signal current output from adjacent cell D2 (i.e., "D2" in FIG. 2H) is accumulated in capacitor CL. When line LO is thus reset, its potential falls to the ground potential. Thereafter, when the pixel signal current generated by cell D2 is accumulated in capacitor CL, the potential of common output line LO changes by the value corresponding to the electric charge of capacitor CL. This change of electric charge is amplified by voltage-amplifying circuit 16. When the selection of cell D2 is completed, analog switch SR is rendered conductive again, thus resetting output line LO, and discharging and initializing output line LO. When the next cell, cell D3 (not shown), is selected, the pixel signal current output by cell D3 is accumulated in capacitor CL, in the same way as described above. Resetting analog switch SR repeatedly resets common output line LO and repeatedly initializes capacitor CL as long as analog switch S1 remains selected. As a result, image output signal Vout having a sawtoothed waveform is output from output terminal 18 of voltage-amplifying circuit 16, as is shown in FIG. 2H.

When the pixel signals have been read out from all cells of unit U1, analog switch S1 is rendered nonconductive, whereas analog switch S2 is rendered conductive. Hence, second cell unit U2 is made active. The pixel signals are read from the cells of this unit U2 in the same way as the pixel signals have been read out from the cells of unit U1. That is, resetting analog switch SR repeats the switching operation as can be understood from FIG. 2G, thereby resetting output line LO and initializing capacitor CL every time a pixel signal current is read out from a cell. As a result, image output signal Vout is read out from the cells of unit U2.

Thereafter, image output signals Vout are read out from all other units U3 to Um. Therefore, the one-line image which has been sensed by the array of photoconductive cells D1, D2, ..., Dn, D(n+1), ..., D2n, ..., Dnm is read out from the image sensor. Then, the image sensor is moved in the lengthwise direction of the document sheet.

The image sensor, which is provided with resetting analog switch SR, can enhance the signal-to-noise ratio of the image signal, and can also read pixel signals from the photoconductive cells at high speed. These advantages of the image sensor will be clearly understood from the following explanation.

FIGS. 3A and 3B are enlarged views of the waveform of control pulse signal supplied to resetting analog switch SR and the waveform of the image signal output from the image sensor. FIG. 3A corresponds to FIG. 2G, and FIG. 3B corresponds to FIG. 2H. As has been described, when any analog switch Si is conductive, resetting analog switch SR resets common output line LO every time the pixel signal current is read out from one cell of unit Ui which is made active. Therefore, as is shown in FIG. 3B, the pixel signal (i.e., a voltage signal) output from each cell has a sawtoothed waveform (i.e., a triangular waveform). More specifically, the output voltage of photoconductive cell D1 starts rising at the trailing edge of control pulse P1, and quickly falls to zero level at the leading edge of next control pulse P2. The effective component Vsig of the pixel signal having this sawtoothed waveform, which depends on the output current of cell D1, is given by the difference between the potential which output line LO has immediately after switch SR has been rendered nonconductive, and the peak potential which the pixel signal has. In other words, effective signal component Vsig is represented by the following equation:

$$Vsig = (I \cdot Toff/C) \cdot G \quad (1)$$

where,
I: pixel signal current output by the cell Toff: off-period of resetting analog switch SR
C: capacitance of electrostatic capacitor CL
G: gain of voltage-amplifying circuit 16

In the conventional contact-type image sensor using load resistor RL connected to common output line LO, the voltage of pixel signal read out from cell D(i−1) must be sufficiently attenuated within period t during which the pixel is read out from the next photoconductive cell Di. Load resistor RL should, therefore, be specifically designed so as to satisfy the following condition:

$$RL \cdot CL << t \quad (2)$$

The value "RL·CL" is thus regarded as the attenuation time constant of the pixel signal. The ratio, z, of the residual signal component is represented by:

$$Z = \exp[-t/CL \cdot RL] \quad (3)$$

The following table shows several representative values for "RL·CL", and several corresponding ratios z.

TABLE

| Time Constant RL CL | Ratio z |
|---|---|
| t | 37% |
| t/2 | 16% |
| t/3 | 5% |
| t/4 | 2% |
| t/5 | 0.7% |

Also, in order to keep the resolution of the image reproduced from the image signal, at a sufficiently great value, ratio z of the residual signal component must be reduced to 5% or less, preferably to 1% or less. Then, as is evident from the above table, it is demanded that attenuation time constant RL·CL be preferably be t/5 or less. The effective component Vsig' of the pixel signal can be given as:

$$\begin{aligned} Vsig' &= I \cdot LR \cdot G \\ &= I \cdot t \cdot G/5CL \end{aligned} \quad (4)$$

As will be apparent from a comparison of equation (4) with equation (1), the voltage component of any pixel signal obtained by the image sensor of the present invention is about five times higher than that of the pixel signal generated by the conventional image sensor. This means that the signal-to-noise ratio of the image signal output by the image sensor of the invention can be about five times greater than that of the image signal produced by the conventional image sensor.

Moreover, it is possible with the present invention to reduce the ratio of residual pixel signal to a value close to the theoretically minimum value. The term "ratio of residual pixel signal", used here, means the ratio of that part of the pixel signal current output from one cell which remains during the period of reading out a pixel signal from the next cell, to said pixel signal current. This ratio can be adjusted by selecting an appropriate value for on-resistance Ron of resetting analog switch SR. More precisely, Such a value as can fulfill the following condition is selected for Ron:

$$Ron \cdot LC << Ton \qquad (5)$$

where Ton is the on-period of analog switch SR.

Let us assume that:

$$Ron \cdot CL = Ton/5 \qquad (6)$$

In this instance, the ratio of residual pixel signal current can easily be reduced to 1% or less. Since the pixel signal component read out from one cell can be quickly attenuated at the start of reading the pixel signal from the next cell, a series of pixel signals can be read out at high speed. In other words, the image sensor of the present invention can generate image signals at a higher speed than the conventional image sensor.

Further, in the present invention, the noise which each of reading analog switches S1 to Sm generates whenever it performs its function, and the noise which drive signal generator 14 generates whenever it outputs a drive signal, can be removed by rendering resetting analog switch SR conductive, thereby grounding common output line LO. Hence, the amount of noise, which is added to the pixel signal being read out from any cell, can be minimized. The signal-to-noise ratio of the pixel signal can thereby maximized.

Still further, in this invention, voltage-amplifying circuit 16 can be a capacitive coupled amplifier. The use of a capacitive coupled amplifier also greatly contributes to the quality of the image reproduced from the image signals output by the image sensor. In the conventional contact-type image sensor, the potential of common output line LO must be detected in order to provide an image signal. The conventional image sensor should, therefore, be provided with a direct current amplifier (also known as a "direct coupled amplifier"). The operation point of the d.c. amplifier drifts with the ambient temperature and/or the power supply voltage. Consequently, the image sensor provided with the d.c. amplifier outputs but an unstable image signal, and the image reproduced from this image signal will be of poor quality. To make matters worse, since two power-supply voltages, i.e., a positive voltage and a negative voltage, are generally required to drive the d.c. amplifier, the image sensor having the d.c. amplifier needs to have a complex internal circuit configuration. This fact runs counter to the demand that image sensors be miniaturized and manufactured at low cost. In contrast, voltage-amplifying circuit 16 used in the image sensor of the present invention can be a capacitive coupled amplifier which has a simple structure and can be operated by a single power supply. This is because, in this invention, the potential change of common output line LO, which occurs after line LO has been reset by analog switch SR, is detected, thereby generating a pixel signal. More specifically, the difference between the potential which line LO has immediately after analog switch SR has been rendered nonconductive, and the potential which line LO has immediately before analog switch SR is rendered conductive, is detected and output in the form of a signal voltage component. Voltage-amplifying circuit 16 operates so as to provide such a signal voltage component, i.e., Vout. Circuit 16 is free of the drifting of the operation point due to the changes in the ambient temperature and/or power-supply voltage, and can thus output a stable image signal Vout. Therefore, circuit 16 can help to reproduce a high-quality image.

Figure 4:
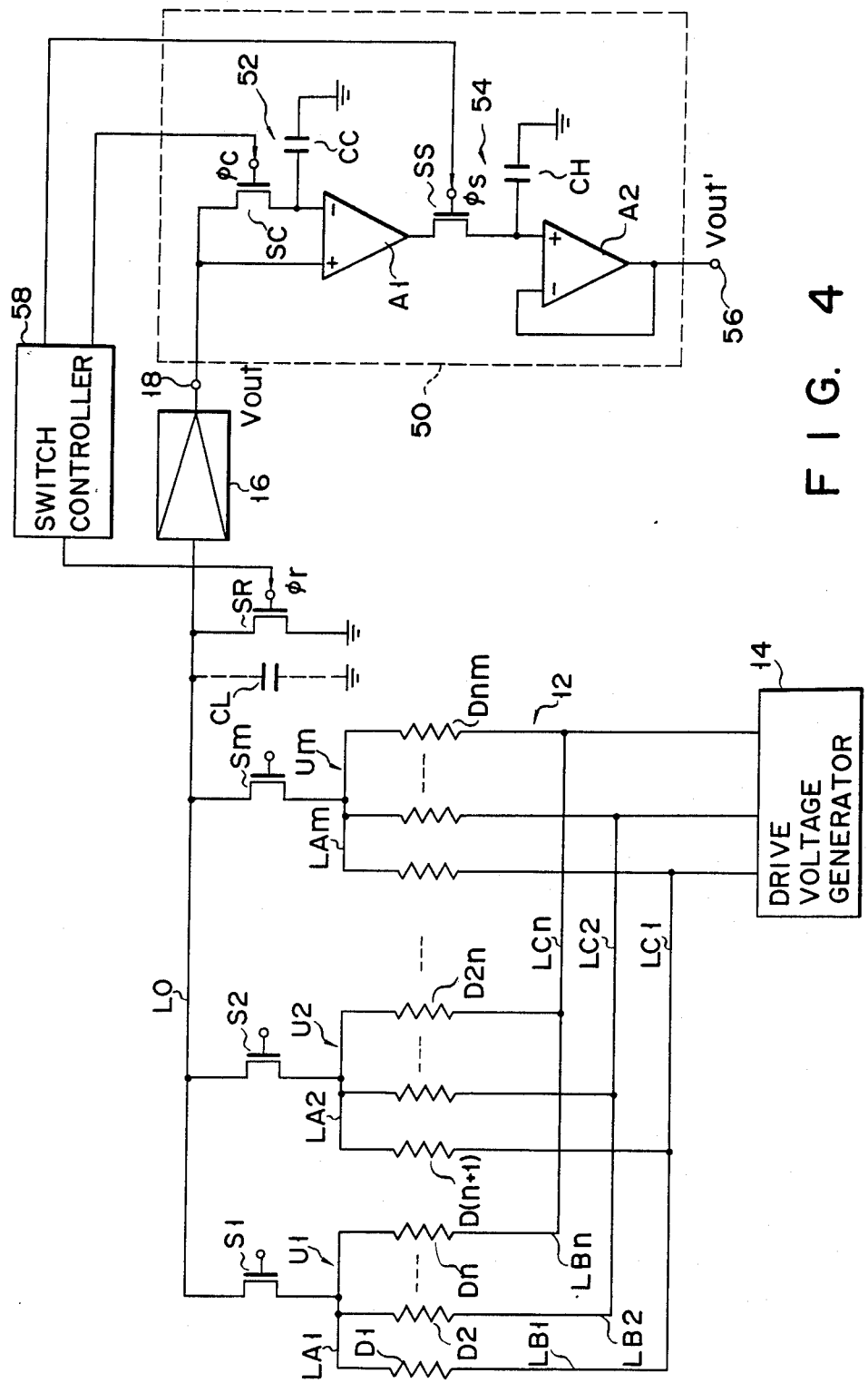
FIG. 4 is a diagram showing the main circuit arrangement of a contact-type, amorphous semiconductor linear image sensor according to a second embodiment of the invention.

FIG. 4 shows another contact-type, linear image sensor according to a second embodiment of the present invention. In this figure, the same components as those of the first embodiment (FIG. 1) are designated by the same numerals. These components will not be described in detail. Further, the substrate of the second embodiment is not shown in FIG. 4 for the sake of illustrative simplification. This embodiment is characterized by image signal readout circuit 50 which can remove the switching noise generated by resetting analog switch SR, thereby to improve the signal-to-noise ratio even more.

As is shown in FIG. 4, capacitive coupled amplifier 16 is connected, at its output terminal 18, to image signal readout circuit 50. Image signal readout circuit 50 includes differential amplifier A1. Differential amplifier A1 has a noninverting input (+) connected to output terminal 18 of amplifier 16, and an inverting input (+) connected by first sample-and-hold circuit 52 to output terminal 18. Sample-and-hold circuit 52 is comprised of analog switch SC and capacitor CC. Analog switch SC, which is a MOSFET, is connected in series between output terminal 18 and the inverting input of differential amplifier A1. Capacitor CC is provided between the inverting input of amplifier A1 and a reference potential (for example, the ground potential).

The output of differential amplifier A1 is connected by second sample-and-hole circuit 54 to the noninverting input of second differential amplifier A2 which functions as a buffer amplifier. Second sample-and-hold circuit 54 is comprised of analog switch SS and capacitor CH. Analog switch SS is coupled in series between the output of first differential amplifier A1 and the noninverting input (+) of second differential amplifier A2. Capacitor CH is provided between the noninverting input of second differential amplifier A2 and the ground potential. The output of differential amplifier A2 is fed back to the inverting input (−) of differential amplifier A2. The output of amplifier A2 is connected to output terminal 56. Terminal 56 functions as the output terminal of image signal readout circuit 50.

Switch controller 58 is connected to the gate electrodes of analog switches SR, SC, and SS. Controller 58 supplies control clock signal $\phi r$ to analog switch SR, control clock signal $\phi c$ to analog switch SS, and control clock signal $\phi s$ to analog switch SS, thereby to control the switching operations of these analog switches.

The contact-type, linear image sensor shown in FIG. 4 operates in the same mode as the image sensor of FIG. 1 until capacitive coupled amplifier 16 generates an image signal. Therefore, the series of pixel signals output by amplifier 16 have such a sawtoothed waveform as is illustrated in FIG. 2H. These output pixel signals are sequentially supplied to image read out circuit 50.

Control pulse signal φr supplied to resetting analog switch SR rises to a high potential-level (i.e., an active level) every time any photoconductive cell Di outputs a pixel signal (See P1 and P2, in FIG. 5A). In response to this signal φr, analog switch SR repeats its switching operation. Every time analog switch SR is rendered conductive, common output line LO is reset, and capacitor CL is initialized, thereby preventing noise from mingling into each pixel signal. In this embodiment, resetting analog switch SR inevitably generates switching noise. The noise component generated by analog switch SR is represent by "Vnoise" in FIG. 5B. This noise component (hereinafter referred to as "reset noise") is superposed with each pixel signal having a sawtoothed waveform, reducing the signal-to-noise ratio of the pixel voltage signal.

When output image signal Vout of amplifier 16, which contains the reset noise, is input to image signal readout circuit 50, switch controller 58 outputs pulse PS1 of control pulse signal φc, which rises at the trailing edge of pulse Pl of reset-control pulse signal φr. More specifically, as is shown in FIG. 5C, pulse PS1 is generated at the start of reading a pixel signal from photoconductive cell D1. This pulse PS1 is supplied to the gate of sampling analog switch SC. Sampling analog switch SC is thereby rendered conductive. As a result, the signal, which amplifier 16 outputs at the start of reading a pixel signal from photoconductive cell D1, is supplied to capacitor CC. At this time, no effective pixel charge has been accumulated in capacitor CL connected to common output line LO. Hence, if the output voltage of amplifier 16 has any potential, this potential has resulted from nothing but the reset noise component. This reset noise component Vnoise (FIG. 5B) is stored in capacitor CC. In other words, noise component Vnoise (a voltage component) generated by resetting analog switch SR is sampled and held by first sample-and-hold circuit 52.

First differential amplifier A1 receives, at its inverting input, reset noise (voltage) component Vnoise from first sample-and-hold circuit 52, and also receives, at its noninverting input, output voltage signal Vout of amplifier 16. As can be understood from FIG. 5B, the output voltage Vout of amplifer 16 rises as each pixel signal is gradually read out, that is, as more and more effective pixel charge is accumulated in capacitor CL for storing the pixel charge. Voltage Vout reaches its peak level when the pixel-reading period expires. First differential amplifier A1 outputs a voltage equal to the difference between the two voltages applied to its inverting and noninverting inputs. The output voltage of differential amplifier A1, thus, accurately represents the effective pixel signal read out from photoconductive cell Di.

As has been described, control pulse signal φs is supplied to second sampling analog switch SS connected in series to the output of first differential amplifier A1. As is shown in FIG. 5D, pulse PS1 of this control signal as is at the high-potential level immediately before the pixel-reading period expires. Sampling analog switch SS is, therefore, rendered conductive immediately before the expiration of the pixel-reading period, thereby transferring the output voltage signal of differential amplifier Al to the noninverting input of second differential amplifier A2. Hence, the output voltage signal of differential amplifier A1, i.e., the pure pixel signal virtually containing no reset noise, is held in capacitor CH of second sample-and hold circuit 54. Thus, image signal Vout' whose signal-to-noise ratio has been maximized as is shown in FIG. 5E, can be supplied from the output of second differential amplifier A2.

The sequence of the operations described the several preceding paragraphs is repeated as photoconductive cells D1 to Dmn, which form a linear array, are selected one after another.

It is true that first sampling analog switch SC and second sampling analog switch SS, themselves, generate switching noises. However, these switching noises can easily be reduced to such extent that they adversely influence the components other than switches SC and SS. This is because any designer of circuits of this kind is able to set the output impedance of amplifier 16 at a low level. Once the output impedance of amplifier 16 has been reduced, the capacitance of both holding capacitors CC and CH can be increased to desired values.

Figure 6:
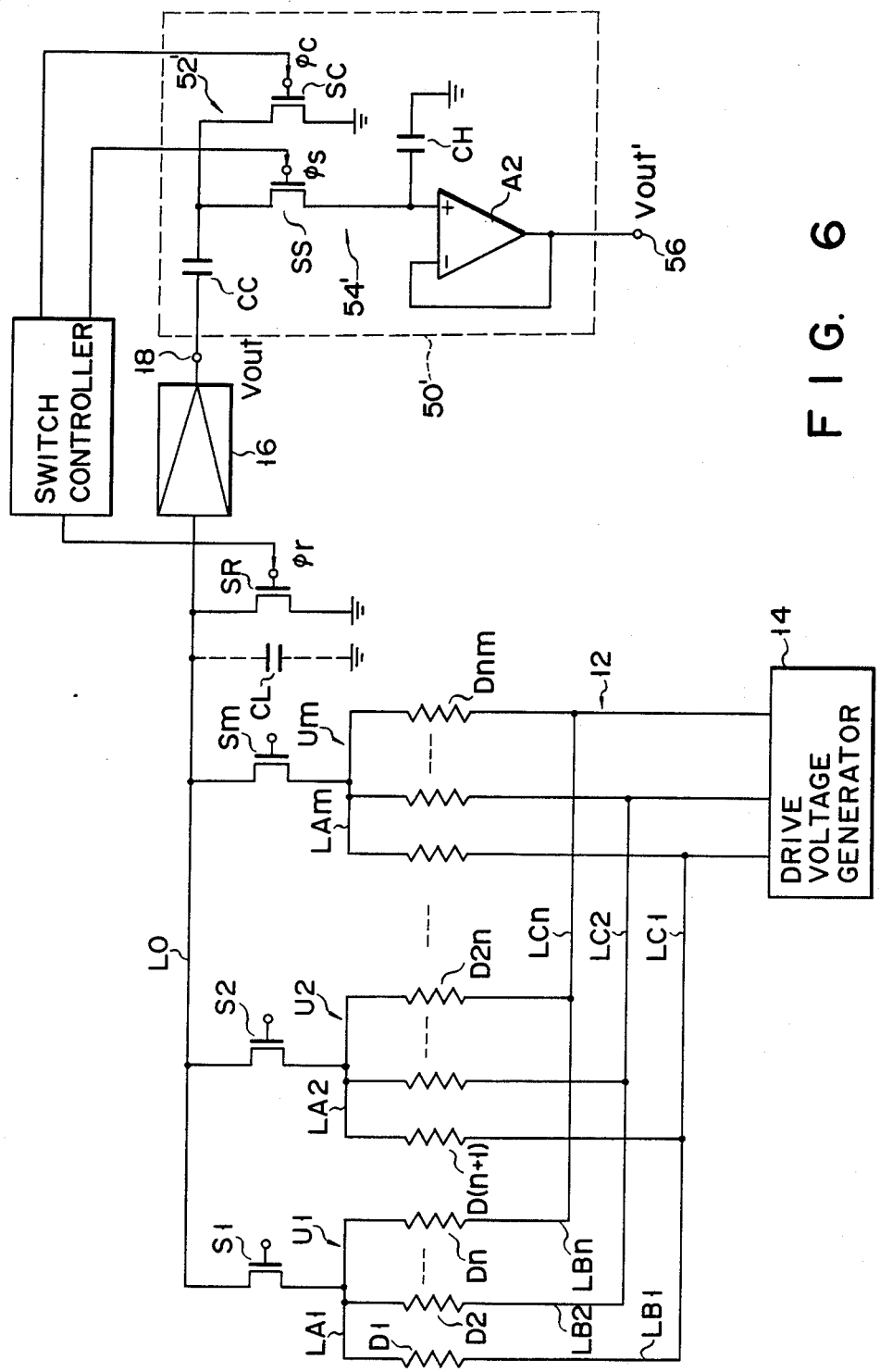
FIG. 6 is a diagram showing the main circuit arrangement of a contact-type, amorphous semiconductor linear image sensor according to a third embodiment of the invention.

FIG. 6 illustrates still another contact-type, linear image sensor according to a third embodiment of the present invention. In this figure, the same components as those of the first and second embodiments (FIG. 1 and FIG. 4) are designated by the same numerals. These components will not be explained in detail. In FIG. 6, as is in FIG. 4, substrate 10 of the third embodiment is not shown for the sake of illustrative simplification. This embodiment is characterized by modified image signal readout circuit 50' which can eliminate the reset noise generated by resetting analog switch SR, too.

As is shown in FIG. 6, modified image signal readout circuit 50', first sample-and-hold circuit 52' comprised of sampling analog switch SC and holding capacitor CC is connected to output terminal of amplifier 16. It should be noted that this sample-and-hold circuit 52' differs from sample-and-hold circuit 52 (FIG. 4) in that capacitor CC is directly connected to output terminal 18. In addition, circuit 50' has no component equivalent to differential amplifier A1 used in the second embodiment shown in FIG. 4. In other words, analog switch SC and capacitor CC take each other's position in the third embodiment.

Second sample-and-hold circuit 54' is comprised of sampling analog switch SS and holding capacitor CH. Analog switch SS is connected in series between capacitor CC and the noninverting input of differential amplifier A2. Capacitor CH is connected, at one end, to the noninverting input cf differential amplifier A2, and, at the other end, to the ground. The output of amplifier A2 is fed back to the inverting input of amplifier A2.

In circuit 50', no component equivalent to amplifier A1 (FIG. 4) is required to detect the difference between output voltage Vout of amplifier 16 and noise voltage component Vnoise applied from sample-and-hold circuit 52. This difference can be detected at the same time the output voltage of first sample-and-hold circuit 52' (i.e., the voltage held in capacitor CC) is applied to second sample-and-hold circuit 54'. Therefore, image signal readout circuit 50' is less complex than circuit 50 used in the second embodiment (FIG. 4).

Although the invention has been described with reference to specific embodiments, it shall not be understood by those skilled in the art that numerous modifications can be made that are within the spirit and scope of the inventive contribution. For instance, although, in the above embodiments, drive signal generator 14 is connected to row lines LC1 to LCn, and image signal readout circuit 50 (or 50′) is connected to common cell electrode wiring lines LA1 to LAm, signal generator 14 can be connected to wiring lines LA1 to LAm, and circuit 50 (or 50′) can be connected to row lines LC1 to CLn.

What is claimed is:

1. A contact-type image sensor comprising:
   (a) a substrate;
   (b) a linear array of amorphous semiconductor photoconductive cells formed on said substrate, said photoconductive cells being divided into cell units each of which has a predetermined number of cells;
   (c) drive means connected to said photoconductive cells, for sequentially selecting said units, and for generating drive voltage signals for sequentially activating the cells of a selected cell unit;
   (d) signal readout means connected to said cell units, for generating a series of pixel voltage signals from pixel currents sequentially supplied from the cells of the selected cell unit, said signal readout means comprising,
   a common signal output line connected to said cell units,
   capacitor means connected to said common signal output line, for sequentially accumulating said pixel currents, and
   analog switch means connected to said common signal output line, for resetting said common signal output line every time one of the cells of each cell unit is designated after a pixel current read out from another cell adjacent to this cell has been accumulated in said capacitor means; and
   (e) noise-eliminator means connected to said common signal output line, for sampling and holding a switching noise voltage corresponding to reset noise generated by said analog switch and contained in each level voltage signal at an initial part of a signal readout period of the selected cell, and for detecting a difference between a voltage appearing on said common signal output line at a first part of the signal readout period and the switching noise voltage, to output said difference as an effective pixel signal, thus removing the reset noise from each pixel voltage signal.

2. The image sensor according to claim 1, wherein said analog switch means comprises a switching transistor connected between said common signal output line and a reference voltage, and being driven and rendered conductive every time one cell of each cell unit is designated after a pixel current read out from another cell, adjacent to this cell, has been accumulated in said capacitor means, thereby to reset said common signal output line and initialize said capacitor means.

3. The image sensor according to claim 2, wherein said signal readout means further comprises controller means connected to said switching transistor, for generating a pulse signal for controlling the switching operation of said transistor.

4. The image sensor according to claim 1, wherein said noise-eliminating means comprises a sample-and-hold circuit connected to said common signal output line, and a differential amplifier having an inverting input connected to said sample-and-hold circuit, and a noninverting input connected to said common signal output line.

5. The image sensor according to claim 4, wherein said sample-and-hold circuit includes second analog switch means, connected between said common signal output line and the inverting input of said differential amplifier, for performing a sampling operation, and a capacitive element connected to the inverting input of said differential amplifier.

6. The image sensor according to claim 5, wherein said noise-eliminating means further comprises a second sample-and-hold circuit, connected to the output of said differential amplifier, and a buffer amplifier having a noninverting input connected to said sample-and-hold circuit, and an output fed back to an inverting input of said buffer amplifier.

7. The image sensor according to claim 6, wherein said second sample-and-hold circuit includes third analog switch means, connected between the output of said differential amplifier and the noninverting input of said buffer amplifier, for performing a sampling operation, and a capacitive element connected to the noninverting input of said differential amplifier.

8. The image sensor according to claim 1, wherein said noise-eliminating means comprises a first sample-and-hold circuit connected to said common signal output line, a second sample-and-hold circuit connected to said common signal output line, and a differential amplifier having an inverting input connected to said second sample-and-hold circuit, and a noninverting input connected to said common signal output line, for functioning as a buffer amplifier.

9. The image sensor according to claim 8, wherein said first sample-and-hold circuit comprises a holding capacitive element connected in series to said common signal output line, and an analog switch connected to said signal-holding capacitive element and having one end connected to the reference voltage, for sampling an input signal.

10. The image sensor according to claim 9, wherein said second sample-and-hold circuit includes a sampling analog switch connected to said common signal output line by the signal-holding capacitive element of said first sample-and-hold circuit, and a capacitive element connected to the noninverting input of said buffer differential amplifier.

11. The image sensor according to claim 1, further comprising:
   (f) a voltage-amplifying circuit connected to said common signal output line, for amplifying an image signal supplied from said photoconductive cells; and
   (g) a plurality of analog switches provided between said cell units, on the one hand, and said common signal output line, on the other.

12. A matrix-driven contact-type linear image sensor comprising:
   (a) an elongated substrate (10);
   (b) an array of amorphous semiconductor photoconductive cells formed on said substrate, said photoconductive cells being divided into a first number of cell units each having a second number of cells which have first ends electrically connected to each other by a common wiring line, and second ends;
   (c) drive means connected to the second ends of the cells of each cell unit, for sequentially selecting a cell unit from among said cell units, and for generating matrix-drive voltage signals for sequentially activating the cells of a selected cell unit; and
   (d) signal readout means connected to said cell units, for generating a series of pixel voltage signals from pixel currents sequentially supplied from the cells of the selected cell unit, said signal readout means comprising, a common signal output line connected to said cell units, a first number of analog selecting switches provided between said cell units, on the one hand, and said common signal output line, on the other hand, and being sequentially rendered conductive, capacitor means connected to said common signal output line, for sequentially accumulating said pixel currents, said capacitor means being an internal electrostatic capacitance including a coupling capacitance inherently present between said common signal output line and said substrate, and parasitic capacitance components of said selecting analog switches, analog switch means connected to said common signal output line, for resetting said common signal output line every time one of the cells of each cell unit is designated after a pixel current read out from another cell, adjacent to this cell, has been accumulated, thereby to initialize said capacitor means, and noise-eliminating means connected to said common signal output line, for sampling and holding a switching noise voltage corresponding to a reset noise generated by said analog switch means and contained in each pixel voltage signal, during a first part of a period for reading the pixel voltage signal from the selected cell, and for detecting the difference between said switching noise voltage and a voltage appearing on said common signal output line during the last part of the period for reading the pixel voltage signal from the selected cell, and then outputting said difference as an effective pixel signal, thereby to remove the reset noise from the pixel voltage signal.

13. The contact-type image sensor according to claim 12, wherein said noise-eliminating means comprises a sample-and-hold circuit having an analog switch and a capacitor.

14. The contact-type image sensor according to claim 12, wherein said noise-eliminating means comprises a sample-and-hold circuit having an analog switch and a capacitor, and a differential amplifier connected to the sample-and-hold circuit and having an inverting input and a noninverting input.

15. The contact-type image sensor according to claim 14, wherein said capacitor is connected between the ground and the inverting input of said differential amplifier.

16. The contact-type image sensor according to claim 14, wherein said capacitor is connected in series to said common signal output line.

17. A contact-type image sensor comprising:
(a) a substrate;
(b) a linear array of amorphous semiconductor photoconductive cells formed on said substrate, said photoconductive cells being divided into cells units each of which has a predetermined number of cells;
(c) driver means connected to said photoconductive cells, for sequentially selecting said cell units, and for generating drive voltage signals for sequentially activating the cells of a selected cell unit;
(d) signal readout means connected to said cell units, for generating a series of pixel voltage signals from the pixel currents sequentially supplied from the cells of the selected cell unit, said signal readout means comprising:

a common signal output line connected to said cell units, capacitor means connected to said common signal output line, for sequentially accumulating said pixel currents, and analog switch means connected to said common signal output line, for resetting said common signal output line at the beginning of every time one of the cells of each cell unit is designated after a pixel current read out from another cell adjacent to this cell has been accumulated in said capacitor means.

18. The image sensor according to claim 17, wherein said analog switch means comprises a switching transistor which is connected between said common signal output line and a reference voltage, and which is rendered conductive at an initial part of every signal readout period of the selected cell of each cell unit to reset said common signal output line and initialize said capacitor means, said switching transistor being rendered nonconductive through the remaining part of the signal readout period, whereby a current flowing in said common signal output line during said remaining part of every signal readout period is accumulated in said capacitor means.

19. The image sensor according to claim 18, wherein said signal readout means further comprises controller means connected to said switching transistor, for generating a pulse signal for controlling the switching operation of said transistor.

* * * * *